United States Patent [19]

Haltenhof

[11] Patent Number: 4,584,850
[45] Date of Patent: Apr. 29, 1986

[54] FLAT-BED KNITTING MACHINE

[75] Inventor: Hans-Günter Haltenhof, Pfullingen, Fed. Rep. of Germany

[73] Assignee: H. Stoll GmbH & Co., Fed. Rep. of Germany

[21] Appl. No.: 702,720

[22] Filed: Feb. 19, 1985

[30] Foreign Application Priority Data

Mar. 3, 1984 [DE] Fed. Rep. of Germany ....... 3407965

[51] Int. Cl.⁴ .............................................. D04B 7/00
[52] U.S. Cl. ..................................................... 66/75.1
[58] Field of Search ................... 66/75.1, 75.2, 78, 123

[56] References Cited

U.S. PATENT DOCUMENTS

| | | | |
|---|---|---|---|
| 3,715,897 | 2/1973 | Hadam | 66/75.2 |
| 3,892,108 | 7/1975 | Hadam | 66/75.2 |
| 4,141,228 | 2/1979 | Schimko | 66/75.1 |
| 4,180,992 | 1/1980 | Schieber et al. | 66/75.1 |
| 4,197,722 | 4/1980 | Cote-Petit et al. | 66/75.2 |
| 4,214,460 | 7/1980 | Shima | 66/75.2 |
| 4,481,793 | 11/1984 | Cuche et al. | 66/75.2 |
| 4,490,994 | 1/1985 | Essig | 66/75.1 |

Primary Examiner—Ronald Feldbaum
Attorney, Agent, or Firm—Jones, Tullar & Cooper

[57] ABSTRACT

A knitting machine, in particular a flat-bed knitting machine with a plurality of needle beds in each of which longitudinally extending needle tricks are formed in which a knitting needle moves longitudinally. The knitting needles comprise two parts, with one part including a needle head and the other part including a needle butt. The needle head defines a stitch forming part and the needle butt defines a movement-initiating part. A coupling device is provided for each needle to couple the two parts together. A coupling operating device is provided on the cam box carriage for operating the coupling devices in such a manner that the stitch forming part which has knitted is separated from the movement-initiating part until such time as the needle is again selected.

22 Claims, 3 Drawing Figures

FLAT-BED KNITTING MACHINE

TECHNICAL FIELD

The present invention relates to a knitting machine and in particular a flat-bed knitting machine having knitting needles which move longitudinally in needle tricks of a needle bed. The knitting needles feature a stitch forming zone at the needle head and an initiating zone at the needle butt. A cam box carriage featuring at least one cam is also included.

PRIOR ART

Although non-selected, and, as a result, non-operating needles on conventional flat-bed knitting machines of the noted type are prevented by switch-operable cam parts from entering the knitting cam track, these needles are still guided past the stitch cam at the end of the knitting cam part, so that they undergo a drawing-down motion of some magnitude, depending upon the setting of the stitch cam (see DE-PS No. 17 60 025). This drawing-down motion is disadvantageous, in that the stitches which are already in the needle hook can tear and empty needles are subjected to the risk of fatigue breakages.

For conventional flat-bed knitting machines of the noted type, which are provided with deflecting jacks, the butt of which is depressed into the needle bed, the non-selected, and therefore non-operating needles are guided over the entire cam width, whereupon they have to undergo a longitudinal motion in the zone of the stitch cam (see DE-OS No. 28 42 054). These types of flat-bed knitting machines having cancelling/depressing cams for the jacks also require a deeper needle bed in the region of the deflecting jacks, and a complicated design structure.

SUMMARY OF THE INVENTION

It is an object of the present invention to provide a knitting machine in particular a flat-bed knitting machine of the type noted above whereby, in a simple manner, the non-selected, and therefore non-operating knitting needles avoid having to traverse along the stitch cam, irrespective of whether it concerns a knitting machine having switch-operable cam parts or a knitting machine having jacks capable of being depressed into the needle bed.

This object is achieved for a knitting machine, in particular a flat-bed knitting machine of the type noted above, in that the stitch forming zone and the initiating zone form separate parts of a two-part knitting needle. A coupling device is provided along with an operating device on the cam box carriage. The coupling device intercouples the stitch forming zone and the initiating zone of the needle. The coupling device is operable by the operating device in such a manner that the stitch forming part which has knitted is separated from the initiating part until such time as the knitting needle is again selected.

According to the present invention the knitting needle is designed in two parts, and, it is achieved by a simple coupling device that the stitch forming part of the knitting needle remains in a rest position when the knitting needle is not selected until such time as the respective needle has been selected again. The risk of torn stitches and of fatigue breakages of empty needles is thus avoided. The coupling device in itself is not mechanically energy consuming and therefore not costly, and even the provision of the additional coupling operating device on the cam box carriage does not effect any particular increase in energy costs. The measures taken according to the present invention can be used not only for such flat-bed knitting machines which are provided with switch-operable cam parts, but also for such flat-bed knitting machines which operate with depressing jacks during selection. The measures taken according to the present invention can be used as an alternative to other machines of the prior art having needle butt cancelling/depressing cams, which require a more deeper needle bed.

A double head needle coupled to a jack on a purl stitch flat-bed knitting machine is disclosed in DE-PS No. 936 649. This coupling merely serves to change the needle from one bed to the other. The problem outlined above, nevertheless still remains, in other words, is not resolved. In accordance with a preferred embodiment of the present invention the coupling device is formed by a lever which is interlinked with one needle part and can intermesh in a locking manner with the other needle part. This is a very simple mechanical method of coupling. In so doing, the lever is advantageously formed for disengagement and/or interlocking by cleats, cams or similar elements arranged on the cam box carriage, which on the passing over of the needles by the cam box carriage pivot the lever. Both motions of the lever, in other words, the disengagement motion as well as the locking motion are best made in a positive manner by corresponding elements. In this case the lever is designed as two arms.

The interlocking and/or disengagement elements can be rigidly arranged. They can, however, also be switch-operable in order to achieve a further selection facility.

Disengagement is achieved after the stitch cam passes by in a position in which the knitting needle is, for example, at an equal camming position or at a position between equal camming and the lowest drawn down position, whilst interlocking of the selected needles can be made in front of, or even in the zone of the needle ejection track, in other words, prior to or during the ejection of the selected needles.

According to a further embodiment of the present invention, a further draw-down motion of the movable parts of the needle is effected after disengagement of both parts of the needle from each other, in order to retain a space between the two parts. In doing so, it is expedient for the movement-initiating part of the needle to be drawn down into a zone in which this part arrives beneath a straigt track of the cam parts if the knitting needle in question is not to be selected again.

BRIEF DESCRIPTION OF THE DRAWINGS

Further details and refinements of the present invention are given in the following description, in which the invention is described and explained in detail with the aid of the examples depicted in the drawing. Shown are.

DESCRIPTION OF THE PREFERRED EMBODIMENTS

Figure 1:
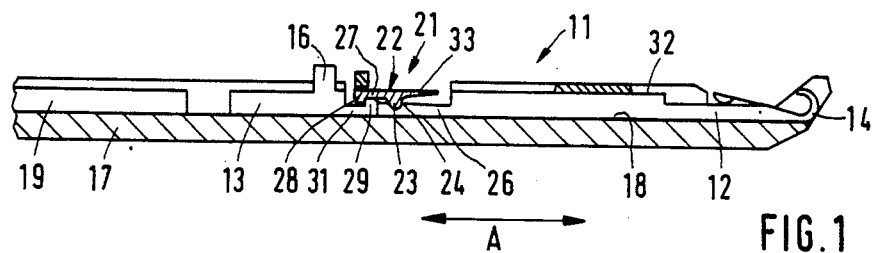
FIG. 1: which is a partial cross-section through a needle trick of a needle bed of a flat-bed knitting machine with knitting needle parts interlocked together.

The coupling arrangement depicted for the knitting needles 11 basically consists of a coupling device 21 on the knitting needles 11 and a coupling operating device 55 on a cam box carriage 36 (FIG. 3) of a flat-bed knitting machine. The coupling arrangement serves to separate a stitch forming part 12 of the knitting needle 11, which is shown here in the form of a latch needle, from its movement-initiating part 13, in order to prevent, in a simple manner, those knitting needles 11 which are not selected, i.e., not operating, from passing through the cam tracks and in so doing, having to move in particular past the stitch cam.

Figure 2:
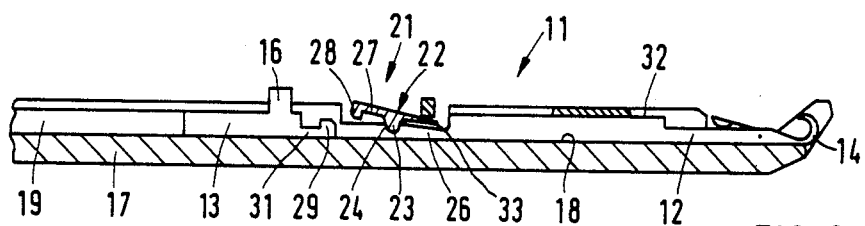
FIG. 2: which is a cross-section corresponding to FIG. 1 but with disengaged knitting needle parts.

According to FIGS. 1 and 2, the latch needle 11 provided with a needle head 14 is designed in two parts, i.e., it has the stitch forming part 12, which includes the needle head 14, and the movement-initiating part 13, which includes the needle butt 16. As is normal practice, a multiplicity of adjacently arranged knitting needles 11 in each needle bed 17 of the flat-bed knitting machine are guided longitudinally and arranged to slide longitudinally in each case in a needle trick 18. At the end of the needle 11 opposite the needle head 14 an intermediate plate 19 is arranged in the needle trick 18. The intermediate plate 19 is in contact with an electromagnetic selection system (not shown). The intermediate plate 19 can be designed as a jack or as a trigger plate so that the arrangement in accordance with the present invention can be utilized for such flat-bed knitting machines where the selection is extended by switch-operable cam parts, as well as where the selection for such flat-bed knitting machines can be extended by depressing jacks into the needle bed 17.

The two parts 12 and 13 of the knitting needle 11 are able to be coupled together by the coupling device 21 in the longitudinal direction as indicated by the double arrow A so that they interlock. The coupling device 21 has a twin-arm ever 22, which is pivotal about a boss 23 arranged on its underside, which is located in a cutout of groove 24 of the rear end 26 provided with a limited height of the stitch forming part 12. The lever 22 is designed in the form of a double arm rocker. The arm 27 of the lever 22 facing the movement-initiating part 13 of the knitting needle 11 is provided with a hook-shaped nib 28 which projects from the underside of the lever 22. This nib 28 can mesh behind a correspondingly formed hook-shaped nib 29 on the front end 31 of the movement-initiating part 13 facing it and projects in a counter-direction. This end, like the end 26 of the part 12 is also not as high as the part 13, such that for the interlocked coupling device 21 (see FIG. 1) the total height of the end 26, including the end 31 and the lever 22, is no greater than the stem height of the stitch forming part 12 of the movement-initiating part 13. As noted, the needle butt 16 is attached to the end 31 of the movement-initiating part 13.

According to FIG. 1 the two ends 26 and 31 lie against each other with their end faces engaged by the interlocked coupling device 21. The back of the lever 22 is therefore approximately parallel to the back of the stem 32 of the knitting needle 11 but closer to the base of the needle trick 18. In FIG. 2 the coupling device 21 is shown. The rocker type lever 22 is set tilted away towards the upper side of the end 26 and the hook-like nib 28 of the locking arm 27 has disengaged itself from the nose 29 of the movement-initiating part 13.

Figure 3:
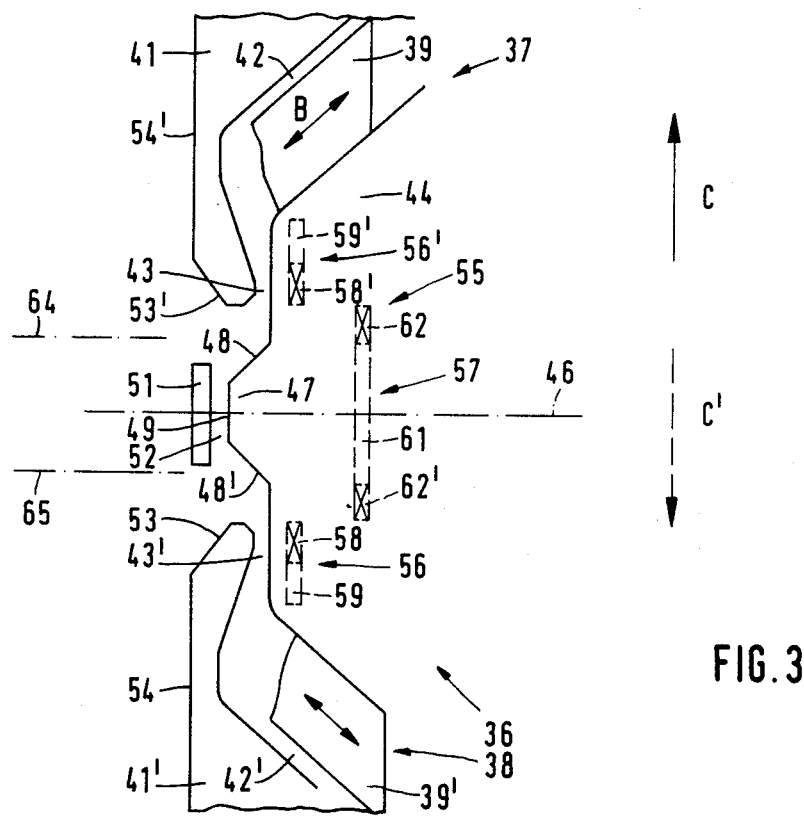
FIG. 3: which is a schematic, plan view on a double cam arrangement arranged on a cam box carriage.

According to FIG. 3 the cam box carriage 26 of the flat-bed knitting machine has two cam arrangements 37 and 38 operating one after the other in the through-feed direction. The cam box carriage 36 can, depending on the form of arrangement, consist of a knitting cam and-/or transfer cam or of a combined knitting/transfer cam. Both cam arrangements 37 and 38 only show their regions facing each other, in each case, in which an adjustable stitch cam 39, 39' is fitted in accordance with the double arrow B. The cam arrangement 37 and 38 is formed with a draw-down track 42, 42' with an opposite rigid cam part 41, 41', which operates as a drive track for the trailing cam arrangement. The draw-down track 42, 42' runs beneath the stitch cam 39, 39' and upwards once more, joining a track section 43, 43'. The track 42, 42' is demarcated by the cam part 41, 41' and a cam part 44 also rigid and fitted opposite between the stitch cams. This cam part 44 is common to both cam arrangements 37, 38 and is symmetrical to a theoretical transverse plane 46 between the cam arrangements 37, 38. The cam part 44 is situated on both sides of this symmetrical plane 46 and is provided with a symmetrical draw-down cam 47, which has initial draw-down tracks 48, 48'. A horizontal track 49 connecting the two initial draw-down tracks 48, 48' forms a track section 52 with an opposite rigid cam part 51. The cam part 51 is arranged offset by the amount of the draw-down height parallel to the track section 43, 43'. The cam part 41, 41' has a second draw-down track 53, 53' at its end facing the cam part 51, which transforms into a horizontal track 54, 54'. The horizontal track 54, 54' is formed by the bottom edge of the cam part 41, 41' and both lie in line with each other. This second draw-down track 53, 53' is a little higher than the horizontal track 49 of the cam part 44 or the draw-down cam 47. The coupling operating device 55 is also fitted to the cam box carriage 36, which has for each direction of movement C, C' a locking cleat 56, 56' and a common disengaging cleat 57 for both directions of movement C, C'. In addition, the two locking cleats 56, 56' are in horizontal alignment and parallel to the disengagement cleat 57 at a distance which corresponds approximately to the length of the lever 22 on the knitting needle 11. The locking cleat 56, 56' has a preceding run-on/ramp section 58, 58' in the direction of movement of the cam box carriage 36 and a section 59, 59' effecting the locking action. The same applies to the disengagement cleat 57, which has a section 61 in its center for effecting the disengagement action, plus a run-on/ramp section 62, 62' at each end of this section 61. The run-on section 58, 58' of the locking cleat 56, 56' is arranged at the height of the track section 43 and 43'. Opposite the run-on section 58, 58' is arranged the run-on section 62, 62' of the disengagement cleat 57 preceding section 58, 58' in the direction of movement of the cam box carriage 36 and arranged preceding the draw-down cam 47.

The process of disengagement and locking of the parts 12 and 13 of the knitting needle 11 occurs as follows:

A knitting needle 11 with the interlocked parts 12 and 13 as per FIG. 1 is guided in the direction of movement C of the cam box carriage 36 by means of the needle butt 16 in the draw-down track 42 and brought after the draw-down motion to the track section 43. Prior to reaching the draw-down cam track 48, in other words, approximately at the theoretical plane 64 the operating arm 33 of the coupling lever 22 arrives under the influence of the disengagement cleat 57, by whose part 61, as shown in FIG. 2, the lever 22 is pivoted, such that the coupling device 21 is opened. In this position, in which the disengagement action takes place, the stitch forming part 12 of the knitting needle 11 is at the equal camming position. Upon further movement of the cam box carriage 36 the needle butt 16 arrives at the draw-down cam 47 or its draw-down track 48 so that it is drawn down further and arrives in the cam track section 52. As a result, the movement-initiating part 13 is moved away from the stitch forming part 12, as shown in FIG. 2, whilst the stitch forming part 12 remains at the equal camming position. During this movement the coupling lever 22 is kept in the open position. It is also possible to achieve disengagement of the needle parts 12 and 13 at a selected zone between the equal camming position and the lowest draw-down of the knitting needle 11, which has just knitted/operated.

Approximately at the theoretical plane 65, selection of the knitting needles 11 is made once again on further movement of the cam box carriage 36 in a manner not depicted with the aid of an electro-magnetic device, not shown. If the knitting needle 11 in question is again selected, then the movement-initiating part 13 is again pushed forwards from its selected intermediate plate 19, so that its needle butt 16 travelling along the draw-down track 48' arrives up into the track part 43' and the end 31 of the part 13 pushes again on the stitch forming part 12 of the knitting needle 11. Under the influence of the locking cleat 56, in whose track the locking arm 27 of the lever 22 lies, the lever 22 is pivoted back so that coupling of the stitch forming part 12 with the movement-initiating part 13 can take place.

If, however, no further selection on passing the electro-magnetic device takes place in the plane 65 for the respective knitting needle 11, then the movement-initiating part 13 is drawn down further at the second draw-down track 53 in order that the needle butt 16 arrives at the horizontal track 54 and remains there. As a result, the stitch forming part 12 remains at the equal camming (or the relevant selected) position, that means it is subjected to no movement of any kind, even in the region of the following stitch cam. This remains the case until this needle is reselected.

The same applies during the movement of the cam box carriage 36 in the counter-direction of the arrow C'. The respective cam parts and track sections symmetrically arranged then come into effect in sequence, the reference numbers of which have been designated with a dash.

For this example it is shown that the locking cleat 56, 56' only comes into play when the part 13 of the knitting needle 11 has pushed against the part 12. It is also possible however to arrange the locking cleat such that the interlocking action does not take place in front of/prior to the ejection of the knitting needles 11, but during the ejection of the knitting needle 11.

According to a further example/embodiment of the present invention, not illustrated, the locking and/or disengagement cleats can be switch-operable, so that it is possible to effect disengagement only when it is determined that the respective needle will not be selected again, which means, that disengagement and re-interlocking does not have to take place each time, when the needle in question is immediately selected again.

What is claimed is:

1. A knitting machine, in particular a flat-bed knitting machine, comprising:

a plurality of needle beds in each of which longitudinally extending needle tricks are formed;

a cam box carriage operatively associated with the needle beds;

a knitting needle disposed in each needle trick of each needle bed to move longitudinally in its respective needle trick, each knitting needle comprising two parts, with one part including a needle head and the other part including a needle butt, the needle head defining a stitch forming part and the needle butt defining a movement-initiating part;

a coupling device for each knitting needle for coupling the two parts of the knitting needle; and a coupling operating device provided on the cam box carriage for engaging and thereby operating the coupling devices to couple and uncouple the stitch forming part of each needle with respect to its movement-initiating part.

2. A knitting machine as defined in claim 1, wherein: each coupling device includes a lever which interlinks with the stitch forming part and intermeshes in an interlocking manner with the movement-initiating part of its respective knitting needle.

3. A knitting machine as defined in claim 2, further wherein:

the lever includes a hook at one of its ends and the movement-initiating part includes a counter-directed hook.

4. A knitting machine as defined in claim 3, further wherein:

the lever further includes a counter-arm on its end opposite to the end including the hook.

5. A knitting machine as defined in claim 1, wherein: each coupling device includes a lever, and;

the coupling operating device includes cleats or similar elements which operate on the arms of the coupling device lever.

6. A knitting machine as defined in claim 5, further wherein:

one arm of the lever includes a locking hook, and;

at least on of said cleats serves as a locking element which operates on the lever arm including the locking hook, and at least one of said cleats serves as a disengagement element which operates on the other arm of the lever.

7. A knitting machine as defined in claim 6, further wherein:

the cam box carriage includes a needle ejection track, and;

the locking element is arranged in the region of the ejection track.

8. A knitting machine as defined in claim 6, further wherein:

the cam box carriage includes a needle ejection track, and;

the locking element is arranged in front of the ejection track.

9. A knitting machine as defined in claim 6, further wherein:

the locking element is adapted to be switched.

10. A knitting machine as defined in claim 6, further wherein:

the disengaging element is adapted to be switched.

11. A knitting machine as defined in claim 6, further wherein:

the locking element and the disengaging element are adapted to be switched.

12. A knitting machine as defined in claim 1, wherein:

each coupling device includes a lever, and;

the coupling operating device includes cams or similar elements which operate on the arms of the coupling lever.

13. A knitting machine as defined in claim 12, further wherein:

one arm of the lever includes a locking hook, and;

at least one of said cams serves as a locking element which operates on the lever arm including the locking hook, and at least one of said cams serves as a disengagement element which operates on the other arm of the lever.

14. A knitting machine as defined in claim 13, further wherein:

the cam box carriage includes a needle ejection track, and;

the locking element is arranged in the region of the ejection track.

15. A knitting machine as defined in claim 13, further wherein:

the cam box carriage includes a needle ejection track, and;

the locking element is arranged in front of the ejection track.

16. A knitting machine as defined in claim 13, further wherein:

the locking element is adapted to be switched.

17. A knitting machine as defined in claim 13, further wherein:

the disengaging element is adapted to be switched.

18. A knitting machine as defined in claim 13, further wherein:

the locking element and the disengaging element are adapted to be switched.

19. A knitting machine as defined in claim 1, wherein:

the coupling operating device is arranged on the cam box carriage relative to the cam parts thereof such that disengagement of the two parts of the needles occurs in a region of the cam box carriage between an equal camming position and the lowest drawdown of the stitch forming part of the needles.

20. A knitting machine as defined in claim 1, wherein:

a further draw-down movement of the movement-initiating part of the needles occurs after disengagement of both parts of the needles.

21. A knitting machine as defined in claim 20, further wherein:

the movement-initiating part of the needles is drawn down for non-selected needles below the cam parts.

22. A knitting machine as defined in claim 20, further wherein:

the coupling operating device includes a locking element and a disengaging element, and;

the cam box carriage includes a first draw-down cam in the region of the disengaging element and a second draw-down cam in front of the locking element.

* * * * *